J. C. MOORE.

AUTOMOBILE JACK.

APPLICATION FILED DEC. 31, 1909.

Reissued May 30, 1911. 13,251.

Witnesses:

Ira P. Perry

Allen J. Samuels

Inventor:

Joseph Calvin Moore

By O. R. Barnett

Atty

THE NORRIS PETERS CO., WASHINGTON, D. C.

UNITED STATES PATENT OFFICE.

JOSEPH CALVIN MOORE, OF CEDAR RAPIDS, IOWA, ASSIGNOR, BY MESNE ASSIGNMENTS, TO WILLIAM A. WALKER, OF RACINE, WISCONSIN.

AUTOMOBILE-JACK.

13,251. Specification of Reissued Letters Patent. Reissued May 30, 1911.

Original No. 876,824, dated January 14, 1908, Serial No. 356,333. Application for reissue filed December 31, 1909. Serial No. 535,889.

*To all whom it may concern:*

Be it known that I, JOSEPH CALVIN MOORE, a citizen of the United States, residing at Cedar Rapids, in the county of Linn and State of Iowa, have invented certain new and useful Improvements in Automobile-Jacks, of which the following is a specification.

The object of this invention is to provide a light, simple and convenient jack by which to raise the wheels of automobiles, when not in use, so as to relieve the tires from the pressure due to the weight of the machine.

The invention is fully disclosed in the description and claims following, reference being had to the accompanying drawing, in which—

Figure 2:
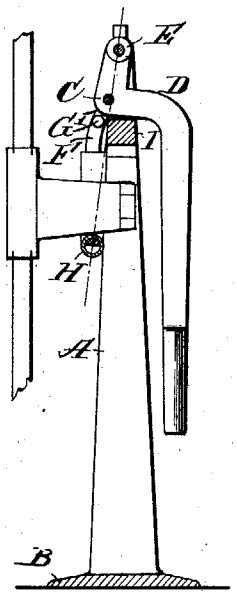
Figure 1:
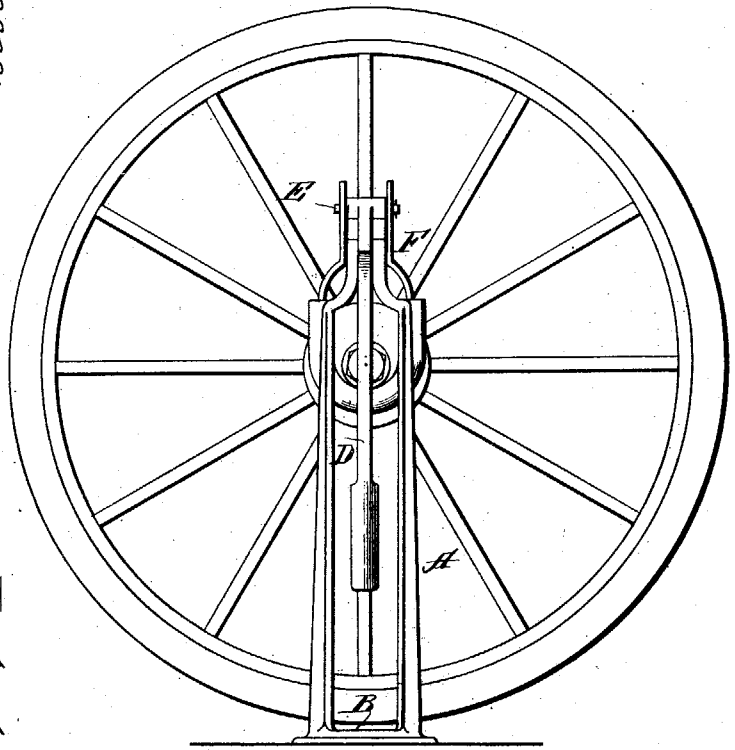

Figure 1 is a front elevation of a jack embodying my invention, as in use. Fig. 2 is a central, vertical section of the same in a plane transverse to Fig. 1.

In the use of an automobile it is possible that as much injury is done to the tires while the machine is at rest as when in action. It is, at all events, desirable to relieve the tires from the weight of the machine while at rest in the garage. A jack for this purpose should be adapted for quick action, since it is most conveniently applied to the outer end of the wheel hub, and consequently four are required. It should also be light enough to be easily handled, and at the same time strong and powerful enough for the heavy duty demanded of it.

Referring to the drawing, A is a bifurcated standard with a connecting base B. The legs of the standard are apart sufficiently to take the outer end of a wheel hub, as shown. At the upper end they converge, and between them is pivoted at C a hand-lever D. The upper end of this lever is suitably pivoted, as by a pin E, to a stirrup F, adapted to take the hub, as clearly shown in both figures of the drawing. The stirrup is formed of flat steel, provided with a series of holes at G for convenience in adjusting it to varying heights of wheel. The semicircular portion of the stirrup may be suitably padded, to prevent marring the wheel hub, in practice by simply stripping over it a short piece of rubber hose H.

In Fig. 2 it will be seen that the legs of the standard are united at I, and this part forms a stop for the bent portion of the hand-lever when fully depressed. In this position the line of draft passes a little outside the lever fulcrum, as indicated by the dotted line, so that the jack is self-locked in the supporting position.

In practice the jack is made of malleable iron, or steel, so as not to be easily broken. Notwithstanding its lightness, it is powerful enough to lift the heaviest wheel by the use of a single hand.

It will be observed that with my invention embodied as shown in the drawings, the wheel is not only readily elevated but is securely held so that it can not be displaced from the jack, two features of the device producing this result, one being the stirrup so shaped that the wheel can not roll off of it and the other being the arrangement of parts whereby the end of the wheel hub may be received between the standards or legs of the jack.

I claim:

1. A vehicle jack adapted to be applied to the outer end of a hub of a vehicle comprising a base, a vertical standard on said base having an opening therein through which the end of the hub may extend, a lever which in the supporting position of the jack is substantially parallel with and lies close to said standard, said lever having a bend toward said standard and being pivoted on the top of the standard at said bend so that it oscillates in a plane at right angles to that of the vehicle wheel, a rigid stirrup having a circular portion adapted to surround the hub transversely thereof, and means for pivoting the stirrup to the lever; the pivotal points of the lever and standard and of the lever and stirrup being so arranged that when the stirrup is in its raised position the pivotal point of the lever on the standard is between the line of draft of the stirrup and the wheel.

2. A vehicle jack adapted to be applied to the outer end of a hub of a vehicle comprising a base, a vertical standard on said base having an opening therein through which the end of the hub may extend, a lever which in the supporting position of the jack is substantially parallel with and lies close to said standard, said lever having a bend toward said standard and being pivoted on the top of the standard at said bend so that it oscillates in a plane at right angles to that of the vehicle wheel said standard being formed with a cross piece which constitutes a stop for the bend of said lever, a rigid stirrup having a circular portion adapted to surround the hub transversely thereof, and means for pivoting the stirrup to a lever; the pivotal points of the lever and standard and of the lever and stirrup being so arranged that when the stirrup is in its raised position the pivotal point of the lever on the standard is between the line of draft of the stirrup and the wheel.

JOSEPH CALVIN MOORE.

Witnesses:

ELSIE HUDSON,

JNO. M. MCGUIRE.

---

Copies of this patent may be obtained for five cents each, by addressing the "Commissioner of Patents, Washington, D. C."